United States Patent [19]

O'Leary

[11] Patent Number: 4,626,000
[45] Date of Patent: Dec. 2, 1986

[54] SPIGOT AND SOCKET CONNECTIONS

[76] Inventor: Michael O'Leary, 18, Willbrook, Whitechurch Road, Rathfarnam, Dublin 14, Ireland

[21] Appl. No.: 530,230

[22] Filed: Sep. 8, 1983

[30] Foreign Application Priority Data

Sep. 8, 1982 [IE] Ireland ................................ 2180/82
Jun. 16, 1983 [IE] Ireland ................................ 1417/83

[51] Int. Cl.⁴ ............................................ F16L 35/00
[52] U.S. Cl. ..................................... 285/39; 285/369; 285/382.2; 72/410
[58] Field of Search ...................... 285/382.2, 39, 322, 285/369; 72/410; 29/516, 517, 521, 237

[56] References Cited

U.S. PATENT DOCUMENTS

| 3,149,861 | 9/1964 | Larsson ....................... 285/382.2 X |
| 3,343,252 | 9/1967 | Reesor ......................... 285/382.2 X |
| 3,375,026 | 3/1968 | Szohatzky ........................... 285/322 |
| 3,596,939 | 8/1971 | Gibson ............................. 285/382.2 |

FOREIGN PATENT DOCUMENTS

| 1809491 | 5/1970 | Fed. Rep. of Germany ... 285/382.2 |
| 856610 | 12/1960 | United Kingdom . |
| 1053629 | 1/1967 | United Kingdom . |
| 1071465 | 6/1967 | United Kingdom . |
| 2058982 | 10/1967 | United Kingdom . |
| 1095683 | 12/1967 | United Kingdom . |
| 1239754 | 7/1971 | United Kingdom . |
| 1267037 | 3/1972 | United Kingdom . |
| 1321652 | 6/1973 | United Kingdom . |
| 1436723 | 5/1976 | United Kingdom . |
| 1542847 | 3/1979 | United Kingdom . |
| 2032537 | 5/1980 | United Kingdom . |
| 1581043 | 12/1980 | United Kingdom . |
| 2090930 | 7/1982 | United Kingdom . |

Primary Examiner—Dave W. Arola
Attorney, Agent, or Firm—Ladas & Parry

[57] ABSTRACT

A sleeve for joining two pipes in end-to-end relationship has a deformable region at each end, each deformable region tapering axially towards the end of the sleeve and being separated from the major constant diameter portion of the sleeve by an external annular shoulder. The annular rear face of each shoulder forms a locating face for annular abutment faces of a deforming tool. The tool has pressure faces for applying a deforming force to each deformable region of the sleeve in turn so as to engage the pipe received within it. The pressure faces are prevented from axial displacement relative to the sleeve during a deforming operation by the mutual abutment of the annular locating faces of the sleeve and tool and the axial taper of the deformable region allows deformation of the sleeve to engage the pipe to take place within lateral buckling of the sleeve.

8 Claims, 13 Drawing Figures

4,626,000

SPIGOT AND SOCKET CONNECTIONS

BACKGROUND OF THE INVENTION

1. Field of the Invention

This invention relates to a spigot and socket connection and in particular to a fitting for a spigot and socket connection such as a pipe joint in which engagement of the spigot within the socket is achieved by the application of a deforming or crimping force to a deformable region of the socket so that it engages the spigot received within it without either the application of heat or the continuing presence of any permanent independent retention means, for example, a screw fastener. The invention also relates to a method of forming such a spigot and socket connection and a tool for applying the deforming or crimping force to the deformable region of the socket.

2. Description of the Prior Art

British Patent Specification No. 856,610 discloses a tube coupling in which a joint is formed by radial compression of a sleeve onto a tube end, by for example a cable joining tool, and local sharp-pointed engaging elements in the initial annular clearance space between the sleeve and the tube end positively interengage in the deformations produced by the radial compression to form rigid unit resistant to compression of the joint.

In British Patent Specification No. 1,267,037, a method of forming a crimped tube joint is described in which a plain cylindrical sleeve is deformed by crimping it between two semi-cylindrical crimping surfaces which when brought together define a cylindrical crimping surface having a diameter less than the initial external diameter of the sleeve. The difficulty of radially compressing such a sleeve to cause uniform sleeve contraction is acknowledged and discussed and in cases where a large amount of compression is required, the method disclosed necessitates progressive compression of the sleeve in a plurality of successive steps employing a series of sets of compressing jaws of progressively smaller diameters of crimping surface in their closed condition.

In the pipe coupling of British Patent Specification No. 1,542,847, a weakened section of a screwed sleeve is deformed after assembly of the joint by a tool having rotary working elements to provide a positive grip between the sleeve and the pipe received in it. The connection between fluids conduits described in British Patent Specification No. 1,053,629 employs a plastics sleeve which is retained on a pipe received within it by the application of crimping pressure to a ductile metal sleeve surrounding the plastics sleeve in its pipe-receiving region. British Patent Specification No. 1,095,683 discloses a tool of relatively complex construction for forming such a connection.

The cylindrical sleeve connector of British Patent Specification No. 1,436,723 has one or more external annular grooves of a width specified in relation to the buckling profile of the wall in the region of the groove(s), so that they will deform radially inwardly in a predetermined manner to engage a pipe received within the sleeve by the application of an axial compressive force to the sleeve. The sleeve disclosed in British published Patent Application No. 2,032,558 A employs internal gripping ridges to ensure retention of a tube being gripped within the sleeve, while in the connection described in British published Patent Application No. 2,090,930 A, the plain cylindrical sleeve may be crimped at a number of points along its axial length and a polymer film interposed between sleeve and tube to ensure a seal.

In these connections of the prior art, the measures adapted to ensure integrity of the joint include the provision of internal engaging elements and the application of high crimping forces using special tools of complicated construction and large dimensions. The use of plain cylindrical fitting allows the location of crimping along the axial length of the fitting to be varied so that consistent and uniformly repeatable joints may not readily be achieved.

BRIEF SUMMARY OF THE INVENTION

1. Object of the Invention

It is an object of the invention to provide a fitting for a spigot and socket connection of the kind in which engagement of the spigot within the socket is achieved by the application of a deforming or crimping force to a deformable region of the socket so that it engages a spigot received within it without either the application of heat of or the continuing presence of any permanent independent retaining means, which will permit the forming of the connection in a single simple operation using a single, preferably manually-operated, tool of compact dimensions. It is a further object of the invention to provide a fitting of this kind in engagement of the spigot and socket may be achieved without the need for any internal intergaging means disposed between the spigot and socket. It is yet another object of the invention to provide a fitting of this kind in which lateral buckling of the fitting during the application of the deforming or crimping force may be substantially avoided.

The invention also has as an object the provision of a method of forming a spigot and socket connection of the kind set out above and the provision of a tool for forming a joint or connection of this kind which will ficilitate the formation of crimped pipe joints in a consistent and readily repeatable manner.

2. Features of the Invention

According to a first aspect of the invention, there is provided a fitting for a spigot and socket connection comprising a socket member having:

(a) an axially extending portion which is deformable for engaging a spigot received within the socket member by the application of a deforming force by one or more pressure faces of a deforming tool, and (b) a portion defining a non-axially disposed abutment face or faces for abutting engagement with an abutment face or faces of said deforming tool, so that at least axial displacement relative to the socket member of at least said pressure face or faces of said deforming tool may be substantially prevented by mutual abutment of the abutment face or faces of the tool and the abutment face or faces of the socket member during the application of a deforming force to said deformable portion of the socket member by said pressure face or faces of the tool.

Preferably, the socket member of the fitting according to this aspect of the invention has an external annular shoulder portion, said deformable portion of the socket member being disposed axially of one axial end of said shoulder portion and the opposite axial end region of said shoulder portion defining said abutment face or faces. In the preferred embodiment, said deformable portion of the socket member extends substantially from said one axial end of the shoulder portion and the wall thickness of said deformable portion of the socket member reduces along the length of said deformable portion in a direction substantially axially away from the shoulder portion.

The or each said abutment face of the socket member may extend in a substantially radial direction so that the abutment face or faces extend circumferentially around the external surface of the socket member and the axial relationship between socket member and tool during a connecting operation is fixed. The socket member may also comprise a further axially extending portion of substantially uniform wall thickness, said deformable portion may be disposed in the free end region of the socket member, and the shoulder portion may be disposed between said axially extending portion of substantially uniform wall thickness and said deformable portion, said opposite axial end region of the shoulder portion then defining a substantially annular said abutment face of the socket member and the radially outer surface of said deformable portion being substantially concavely frusto-conical. Suficient sealing of a connection according to the invention may be achieved without the presence of any sealing material, but preferably, the socket member is provided with an internal annulus of resilient sealing material. In a preferred embodiment, the socket member has an inwardly opening substantially annular recess for receiving an O-ring, said recess being located radially inwardly of said shoulder portion of the socket member.

In a particular construction, the fitting is a sleeve having a socket at each end for receiving a respective pipe. Alternatively the fitting may be a Tee piece, or it may be an elbow or any other form of connector encountered in the connection of piping networks. In a particularly preferred embodiment, the invention provides a fitting for a spigot and socket connection comprising a socket having a free end region which is deformable for engaging a spigot received within the socket, the socket having a first axially extending socket portion of substantially uniform wall thickness and a second axially extending socket portion in said free end region, the wall thickness of at least a part of which is less than that of the socket portion of substantially uniform wall thickness, the socket also having an external annular shoulder portion disposed between said axially extending socket portion of substantially uniform wall thickness and that of lesser wall thickness, the lesser wall thickness socket portion extending from a front region of the shoulder portion towards the free end of the socket and an annular substantially radially extending rear face of the shoulder portion defining an abutment face of the socket for abutting engagement with an abutment face or faces of a deforming tool during deformation of the free end region of the socket for engagement with a spigot received within the socket.

According to a second aspect of the invention, there is provided a method of forming a spigot and socket connection comprising the steps of (a) inserting a spigot into a socket member having an axially extending portion which is deformable for engaging a spigot received therewithin by the application of a deforming force by one or more pressure faces of a deforming tool, the socket member also having a portion defining a non-axially disposed abutment face or faces for abutting engagement with an abutment face or faces of said deforming tool, (b) applying a said deforming tool to said socket member so that said abutment face or faces of the tool abut the abutment face or faces of the socket member and the pressure face or faces of the tool engage said deformable portion of the socket member, and (c) applying a deforming force to said deformable portion of the socket member by means of said tool so that at least said deformable portion is deformed to engage the spigot received therewithin, at least axial displacement relative to the socket member of at least the pressure face or faces of the tool being substantially prevented by mutual abutment of the abutment face or faces of the tool and the abutment face or faces of the socket member during the application of said deforming force.

According to a third aspect of the invention, there is provided a tool for connecting a socket member having a deformable portion to a spigot received within the socket member, comprising at least two tool portions displaceable between a closed position in which they may substantially surround a said socket member during a connecting operation and an open position in which they may be located about a said socket member preparatory to a connecting operation each tool portion having a respective pressure face or faces for deforming engagement with the deformable portion of the socket member and an abutment face or faces for engagement with a non-axially disposed abutment face or faces of the socket member during deforming engagement of the pressure face or faces and the deformable socket member portion.

In a preferred construction, the tool portions define a substantially annular recess in the closed configuration of the tool and the pressure faces and abutment faces of the tool portions are disposed at axially opposite sides of the recess. The abutment faces of the tool portions may define a substantially radially extending annular surface in the closed configuration of the tool and the closing movement of the tool portions may be limited by abutment of opposed faces of the tool portions in the closed configuration of the tool.

The dimensions of the tool portions are preferably such that during a closing movement of the tool portions, the pressure faces may exert a deforming force on the deformable portion of a socket member sufficient to deform also a portion of the material of a spigot received within the socket member, before said closing movement is terminated by abutment of said opposed faces of the tool portions. The pressure faces may also be shaped to apply a deforming force which has both radial and axial components to the deformable portion of a socket member during a deforming operation.

The invention facilitates the formation of pipe joints in domestic houses in particular by reducing the amount of time and equipment required to make the joints. The connection and method of the invention may provide adequate resistance against leaks and axial separation of joints under pressure without any significant deformation of the pipes to which the fitting of the invention is applied, but the sealing connection may advantageously be formed by deforming the material of the spigot or pipe as well as that of the socket to a limited extent, in the region underlying the deformable portion of the socket member. Lateral buckling of the fitting which may interfere with proper formation of the joint is minimised in particular by the construction of the invention in which the deformable socket member portion tapers frusto-conically towards the free end of the socket so that axial shaping as well as radial compression of the material of the socket member is permitted during formation of a joint. The tool according to the invention is especially suited to manual operation, and precise positioning of the tool on the fitting is ensured by the interengagement of the abutment faces of the socket member and tool during a connecting operation, so that the pressure faces of the tool are correctly aligned with the deformable portion of the socket member and the deforming force is applied to the deformable portion in a consistent and reproducible manner.

BRIEF DESCRIPTION OF THE DRAWINGS

Some embodiments of the invention will now be described by way of example, having regard to the accompanying drawings, in which.

DETAILED DESCRIPTION OF THE INVENTION

Figure 1:
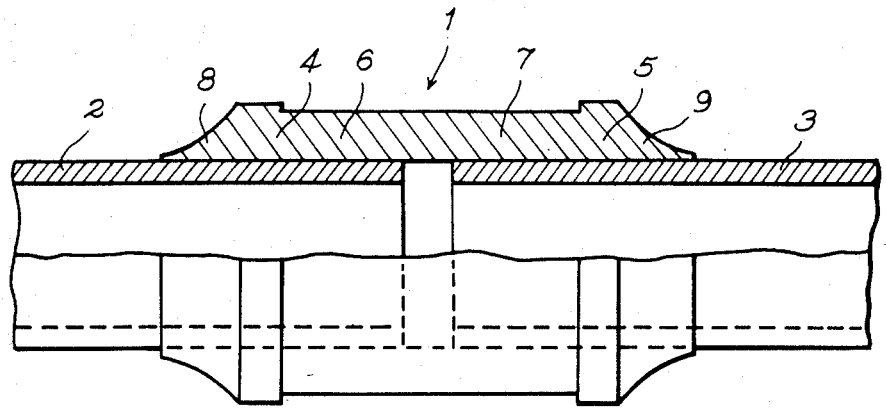
FIG. 1 shows a first embodiment of a sleeve connector according to the invention for the end to end connection of two pipes, in partial axial section.

As shown in FIG. 1, a first embodiment of a fitting according to the invention for a spigot and socket connection consists of a sleeve connector 1, which fits in generally conventional manner over the adjacent or abutting ends of pipes 2 and 3 to be joined together. The ends of the pipes 2 and 3 may abut within the sleeve connector 1, or they may be spaced apart as shown, or alternatively the sleeve connector may include an abutment portion in its central region, in the form of an inwardly extending circumferential projection, against which the end of each pipe 2 and 3 may abut. Each end of the sleeve connector 1 defines a socket, respectively 4 and 5, and the end region of each pipe forms a spigot relative to the respective socket 4 or 5, so that the complete pipe joint consists of two spigot and socket connections in a back-to-back configuration. Over the greater part of its length, the sleeve connector 1 consists of a substantially cylindrical structure which defines respective axially extending socket portions 6 and 7 of substantially uniform wall thickness. The free end regions of the respective sockets 4 and 5, which are axially outwards of the socket portions 6 and 7, define further axially extending socket portions 8 and 9, the wall thickness of the axially outermost part of each of these socket portions being reduced by comparison with that of the uniform wall thickness portions 6 and 7.

Figure 2:
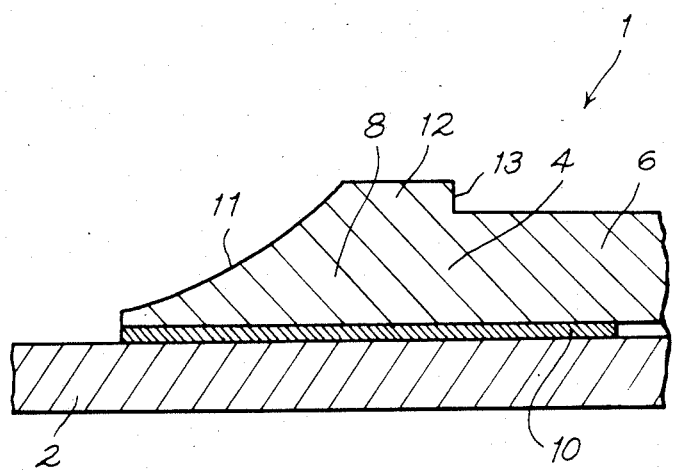
FIG. 2 shows a detail of the free end region of the connector of FIG. 1 and the pipe on which it is mounted, in axial section.

FIG. 2 shows the socket portion 8 in greater detail, and should now be considered along with FIG. 1. This Figure also shows an internal annulus 10 of a deformable sealing material such as a suitably resistant rubber, which may optionally be provided in the fitting of the invention, depending on the degree of sealing required and the nature of the substance flowing through the pipes to be connected. The reduced wall thickness socket portion 8 has an external surface 11 which is concavely frusto-conical with respect to the axis of the connector, so that the external surface of the socket in this region tapers inwardly towards the axis of the socket in the direction of the free end of the socket. A crimping or connecting force is applied to the socket in this region to cause it to grip a spigot received within it and to retain the spigot within the socket, as will be described subsequently. Between the socket portion 8 of reduced wall thickness and the portion 6 of substantially uniform wall thickness, the socket 4 has an external annular shoulder portion 12, which is of greater external diameter than the socket portion 6 of uniform wall thickness and has an annular rear face 13 at its end adjacent the uniform wall thickness socket portion 6. As shown in FIGS. 1 and 2 this face 13 extends substantially radially with respect to the axis of the connector, and is intended to serve as an abutment face for a mating face of a tool for forming the joint between the socket and a pipe received within it. The tapering surface 11 of the socket portion 8 extends from the front region of the shoulder portion 12 in the direction of the free end of the socket.

Figure 3:
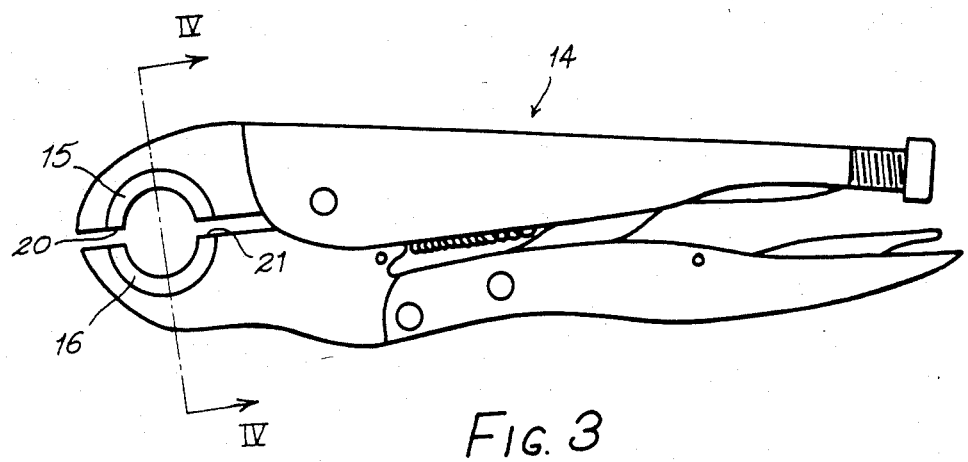
FIG. 3 shows one embodiment of a tool suitable for forming a pipe joint using a fitting according to the invention.
Figure 4:
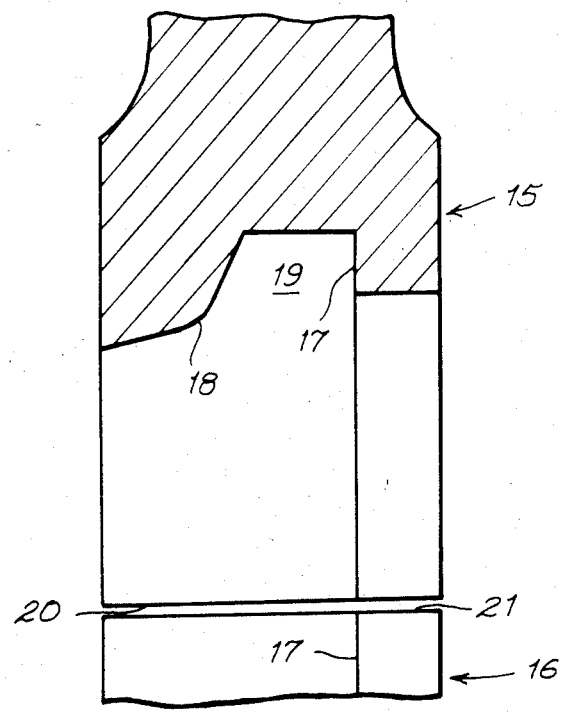
FIG. 4 shows a portion of one of the jaws of the tool of FIG. 3, on the section line IV—IV of FIG. 3.

An example of a tool 14 suitable for forming a connection between a fitting according to the invention and a spigot received within it is shown in FIG. 3. This will be seen to be of the Vise-Grip (Trade Mark) type, but the jaws are fitted with specially adapted heads 15 and 16, details of which are shown in the sectional view of FIG. 4, along the line IV—IV of FIG. 3, for forming the spigot and socket connection of the invention. The heads 15 and 16 are displaceable between a closed position in which they may enclose the socket portion 8 and shoulder portion 12 of a fitting according to the invention such as the socket connector of FIGS. 1 and 2, and an open position in which they are spaced apart and may be positioned about the socket connector preparatory to a connecting operation. As shown in FIG. 4, each head 15 and 16 has a substantially radially extending abutment face 17 which during use of the tool abuts against the face 13 of the socket shoulder portion 12. Each head also has a convexly curved pressure face 18 which is substantially complementary in its axial profile to the concavely frusto-conical curvature of the deformable portion of the socket and which in use of the tool is urged against the surface 11 of the socket portion 8 of reduced wall thickness, to deform it and bring it into sealing engagement with the exterior surface of the wall of the pipe received within it, or to sealingly compress the resilient material 10 between the pipe and the socket interior, as the case may be. Each of these surfaces assumes an annular configuration in the fully closed condition of the tool when the facing planar surfaces 20 and 21 of the heads 15 and 16 abut against each other, and as shown in FIG. 4, the surfaces 17 and 18 are disposed at opposite axial sides of an annular recess 19 defined by the heads 15, 16 in this fully closed condition of the tool.

Figure 5:
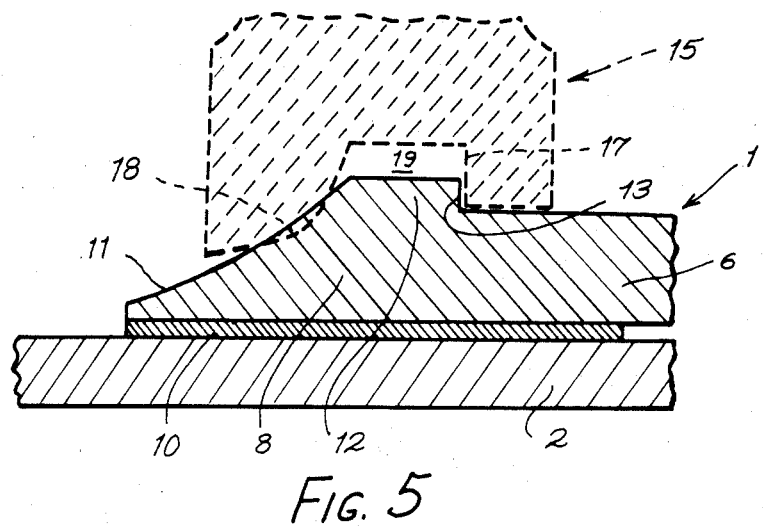
FIG. 5 is an axial sectional view showing the relationship of the free end region of the connector socket of FIGS. 1 and 2 and a jaw of the tool of FIG. 3 during a sleeve-to-pipe connecting operation.

The relationship between the socket and the tool head 15 during a connecting operation is shown in FIG. 5. The mutual abutment of the annular abutment faces 13 and 17 of the socket and tool head respectively serves to maintain the tool head in a fixed axial disposition relative to the socket during operation of the tool, so that the pressure surface 18 bears down on the tapering surface 11 of the socket during operation of the tool to cause deformation of the socket portion 8 to engage the pipe 2. The final position of the head 15 is shown in FIG. 5, in dotted outline, and it wil be seen that in order to achieve this final position, displacement or shaping of some of the material of the reduced wall thickness socket portion is necessary. This feature will be further explained in the following description of the method of forming a pipe joint according to the invention, in which reference is made to the socket connector and tool of FIGS. 1 to 5.

In carrying out the method of forming a spigot and socket connection according to the invention, the end portions of the pipes 2 and 3 are placed within the sockets 4 and 5 as shown in FIG. 1 and the tool heads 15 and 16 are positioned about the socket portion 8 in their open position. The tool is then partially closed by manual operation so that the heads 15 and 16 sustantially surround the socket portion 8 and the shoulder portion 12 of the socket connector 1. At this stage no pressure is applied to the surface 11 by the tool heads, and the heads are not in their fully closed position when they fully enclose the socket and the surfaces 17 and 18 and the recess 19 assume annular configurations. The position of the tool head is adjusted until the abutment faces 13 of the socket shoulder portion and 17 of the head are substantially in abutment and maximum force is then applied by manually gripping the handles of the tool and urging them together, until the heads are moved towards each other to their maximum extent, when their facing planar surfaces 20 and 21 abut and they together assume a ring-shaped configuration. During the squeezing together of the heads, the surfaces 18 of the heads press against the surface 11 of the socket and deform the socket portion 8 in this region, so that it grips the spigot or pipe 2 in a sealing manner, optionally through a resilient intermediate layer 10. The abutment of the faces 13 and 18 prevents axial displacement of the tool heads in the direction of tapering of socket portion 8, so that they only move radially inwardly towards each other, in the course of which movement, as can be seen clearly from FIG. 5, they carry out a deforming displacement or shaping of the material of the socket portion 8 engaged by the pressure surfaces 18 of the heads. It will also be clear from FIG. 5 that because of the convex curvature of the pressure faces 18, the inward radial movement of the heads exerts a force having both axial and radial components on the material of the socket, so that there is both axial and radial working or deformation of the material. In this way, crushing or radial deformation of the material of the pipe 2 may be minimised so that it substantially retains its generally circular pre-connection shape. While a proportion of the crimping force applied to the fitting is thus taken up in elongation of the material of the socket portion 8, the radial compression of the socket is nonetheless sufficient to provide the necessary retaining force to hold the pipe in the socket.

Thus while the method according to the invention described above is akin to conventional crimping, the radial forces exerted may be less than apply for example in the crimping of electric cable joints, and prevent excessive forces which would lead to collapse of the pipe from being exerted in the course of a joining operation. The meeting of the tool heads 15 and 16 on their faces 20 and 21 at the end of a closing movement or operation of the tool also prevents a joint from being overshaped, while manual operation of the tool imposes a further limit on the force which can be applied. Thus the fitting and method according to the invention are particularly suitable for light gauge copper pipework such as is used in the domestic situation. The fittings may be made of brass and where a rubber insert is employed this is of a composition not giving rise to harmful reactions with the copper. The fitting according to the invention is also suitable for polyethylene pipes, in which case it is possible to forego any use of an internal rubber sealing ring, since effective sealing is assured by the resilient pipe material itself.

Figure 6:
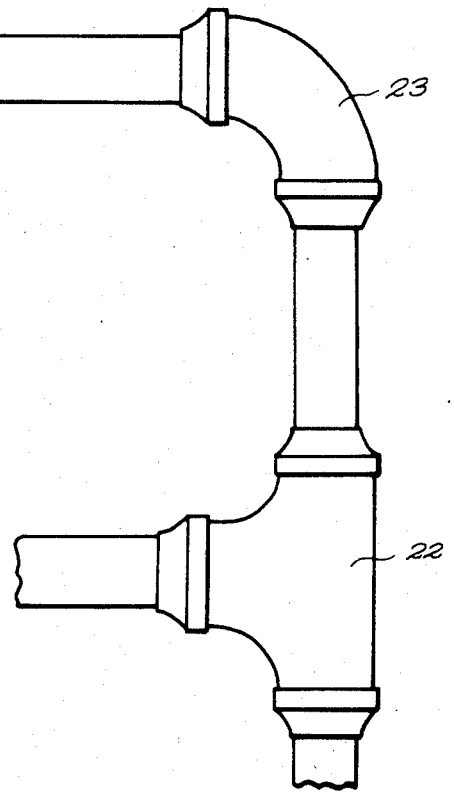
FIG. 6 shows a portion of a pipe network including a variety of fittings according to the invention.

A typical sleeve connector for copper piping may have an internal diameter of ⅝", an external diameter over its portion of substantially uniform wall thickness of ¾", tapering to 21/32" at the free ends of the reduced wall thickness socket portions, the overall length of the fitting being 1½", the spacing between the shoulder portions being ⅞" and each shoulder portion having an axial length of 1/16". The rubber sealing element, where present, is typically of the order of 1/32" thick. It will be seen that different sizes of fitting will require different tool heads, which may be interchangeably mountable on the tool 14. An embodiment of the tool 14 may also be provided having two sets of spaced apart heads for forming the connection to each end of a single sleeve connector simultaneously. FIG. 6 shows a variety of pipe fittings according to the invention including a sleeve 1, a Tee piece 22 and an elbow 23. These are depicted as interconnecting pipes of the same diameter, but it will be appreciated that the invention also extends to fittings suitable for joining pipes of different diameter, by the provision of fitting in which the diameters of the socket portions differ from one another. The fitting according to the invention is especially suited to, but is not restricted to, pipes of up to 1" in diameter. However larger sizes of pipe may also be joined by means of the invention.

Figure 7:
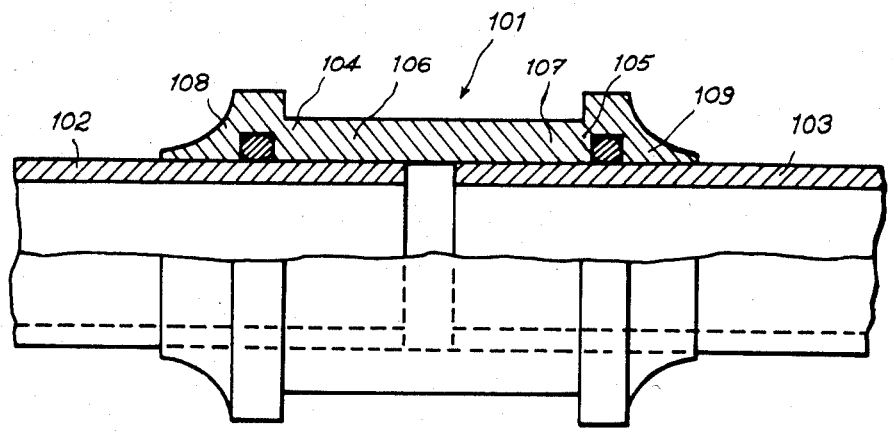
FIG. 7 shows, in part axial section, an alternative embodiment of a sleeve connector according to the invention for the end to end connection of two pipes.

As shown in FIG. 7 an alternative embodiment of a fitting according to the present invention for a spigot and socket connection consists of a sleeve connector 101 which is initially fitted in generally conventional manner with a sliding fit over the adjacent or abutting ends of pipes 102 and 103 to be joined together. The ends of the pipes 102 and 103 may abut within the sleeve connector 101, or they may be spaced apart as shown, or the sleeve connector may include an abutment portion in its central region, in the form of an inwardly extending circumferential projection, against which the ends of pipes 102 and 103 may abut. Each end of the sleeve connector 101 defines a socket, respectively 104 and 105, and the end region of each pipe forms a spigot relative to the respective socket 104 or 105, so that the complete pipe joint consists of two spigot and socket connections in a back-to-back configuration. Over the greater part of its length, the sleeve connector 101 consists of a substantially cylindrical structure which defines respective axially extending socket portions 106 and 107 of substantially uniform wall thickness. The free end regions of the respective sockets 104 and 105, which are axially outwards of the socket portions 106 and 107, define further axially extending socket portions 108 and 109, the wall thickness of the axially outermost part of each of these socket portions being reduced by comparison with that of the uniform wall thickness portions 106 and 107.

Figure 8:
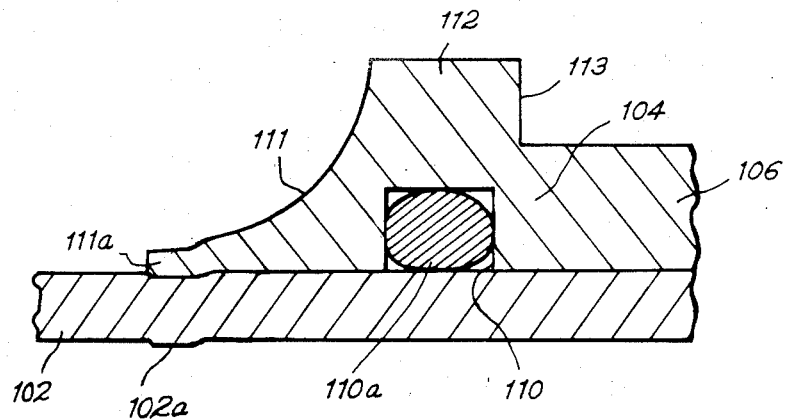
FIG. 8 shows in axial section a detail of the free end region of the connector of FIG. 7 and the pipe on which it is mounted.

FIG. 8 shows the socket portion 108 in greater detail. The external surface 111 of portion 108 is concavely frusto-conical with respect to the longitudinal axis of the connector 101, so that the external surface of the socket in this region tapers inwardly towards the axis of the socket in the direction of the free end of the socket. A crimping or connecting force is applied to the socket in this region to cause it to grip a spigot received within it and to retain the spigot within the socket, as described hereinafter. The slightly deformed end portion of the socket resulting from the carrying out of a crimping or connecting operation is indicated at 111a and the slightly deformed portion of the wall of the pipe 102 underlying this deformed end portion of the socket is indicated by 102a. It will be appreciated that the drawings are intended to illustrate the invention and are not necessarily to scale. In particular the wall thickness of the pipe 102 may in reality be reduced by comparison with that shown.

Between the socket portion 108 of reduced wall thickness and the portion 106 of substantially uniform wall thickness, the socket 104 has an external annular shoulder portion 112, which is of greater external diameter that the socket portion 106 of uniform wall thickness and has an annular rear face 113 at its end adjacent to the uniform wall thickness socket portion 106. As shown in FIGS. 7 and 8, this face 113 extends substantially radially with respect to the axis of the connector and serves as an abutment face for a mating or cooperating face of a tool for forming the joint between the socket and a pipe received within it. The tapering surface 111 of the socket portion 108 extends from the front region of the shoulder portion 112 in the direction of the free end of the socket. The socket 104 also has an inwardly opening annular recess 110 which is located within the shoulder region of the socket and accommodates an annular O-ring 110a. The O-ring 110a is made of a deformable resilient material and forms a seal between the walls of the recess 110 and the exterior of the wall of the pipe 102.

A suitable material for the O-ring 110a is Dowty Seals Material Reference 2064, which is a synthetic elastomer-based compound approved by the National Water Council of England and Wales for use in potable water supplies. It has good long-term retention of properties, even after exposure to steam and hot water up to 120° C.

Figure 9:
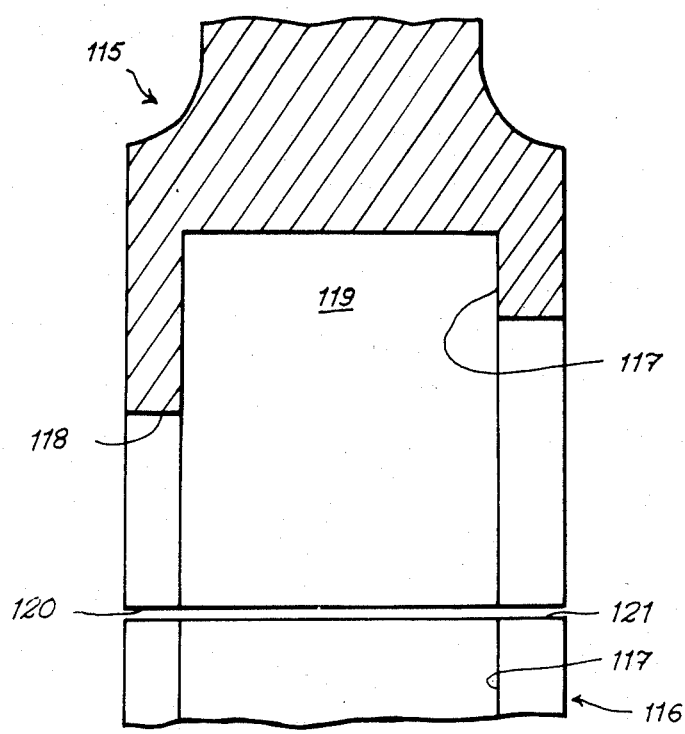
FIG. 9 shows, in axial section, a portion of one of the jaws of an alternative embodiment of a tool according to the invention for sealingly engaging a socket according to the invention into a spigot received therewithin.

A connection between a fitting according to the invention and a spigot received within it may be formed by a tool similar to that already shown and described in regard to FIG. 3. An alternative construction of heads 115 and 116 for the tool 14 of FIG. 3 is shown in FIG. 9, these heads being particularly suited for use with the connector of FIGS. 7 and 8 and taking the place of heads 15 and 16 of tool 14 of FIGS. 3 and 4. As shown in FIG. 9, each head 115 and 116 has a substantially radially extending abutment face 117 which during use of the tool abuts against the face 113 of the socket shoulder portion 112. Each head also has a pressure face 118 which in use of the tool is urged against the surface 111 of the socket portion 108 of reduced wall thickness, to bring it into engagement with the exterior surface of the wall of the pipe received within it by deformation both of the end region of the socket portion of reduced wall thickness and of an underlying portion of the wall of the pipe 102. By contrast with the convexly curved pressure surfaces 18 of the tool head shown in FIG. 4, the faces 118 of the tool head according to the construction shown in FIG. 10 substantially define a cylinder in the closed condition of the tool the axis of which is generally coaxial with that of the fitting. The surfaces 117 and 118 each assume an annular configuration in the fully closed condition of the tool, when the facing planar surfaces 120 and 121 of the heads 115 and 116 abut against each other, and as shown in FIG. 9, they are disposed at opposite axial sides of an annular recess 119 defined by the heads 115 and 116 in this fully closed condition of the tool.

Figure 10:
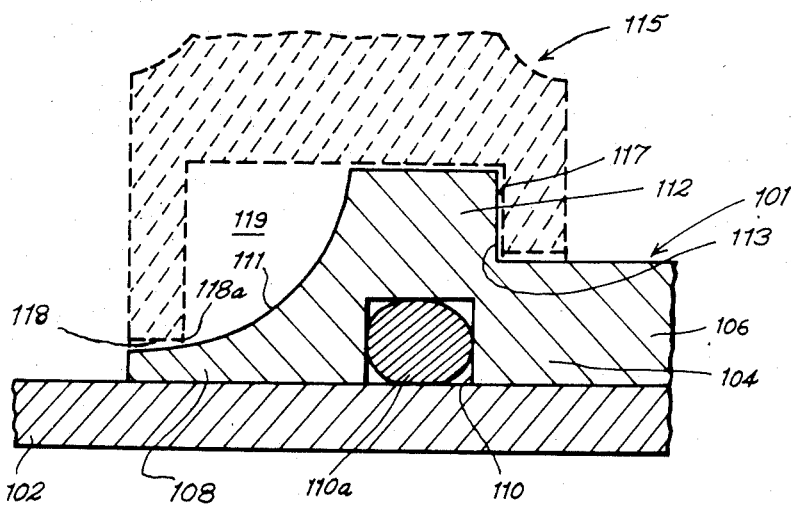
FIG. 10 is an axial sectional view showing the relationship of the free end region of the connector socket of FIGS. 7 and 8 and a jaw of the tool as shown in FIG. 9, during a sleeve-to-pipe connecting operation.

The relationship between the socket and the tool head 115 during a connecting operation but prior to the application of the actual socket end deforming force is shown in FIG. 10. The mutual abutment of the annular abutment faces 113 and 117 of the socket and tool head respectively serves to maintain the tool head in a fixed axial disposition relative to the socket by preventing axial displacement of the tool heads in the direction of taper of socket portion 108, so that the pressure surface 118 bears down on the tapering surface 111 of the socket during operation of the tool to cause deformation of the free end of the socket portion 108 to engage the pipe 102. The position of the head 115 is shown in dotted outline in FIG. 10 prior to the application of the final deforming force. In order to bring the tool heads 115 and 116 to their closed position, in which the surfaces 120 and 121 abut, displacement or shaping of some of the material of the reduced wall thickness socket portion is necessary. This takes place by a slight deformation in a substantially radially inward direction of both the free end region of the socket and the underlying portion of the wall of the pipe.

Some elongation of the socket material may also come about, and in particular, such elongation or displacement of the material of the socket permits abutment of the faces 120 and 121 of the tool heads in substantially all circumstances, so that the tool can be fully closed. The tapering configuration of the end portion of the socket towards its free end facilitates this elongation or displacement of material and accordingly buckling of the socket wall or radially outward displacement of the material of the socket into the region between the approaching faces 120 and 121 of the tool heads during the final stage of a crimping or connecting operation is largely avoided. Thus there is effectively no pinching of the material of the socket between these faces 120 and 121 and a satisfactory connection can therefore be achieved by the connecting operation according to the invention. This elongation or displacement of the socket material results from the cooperation between the concavely frusto-conically profiled or tapered end portion of the socket and the pressure faces 118 of the tool and permits a positive engagement of spigot and socket to be achieved with the use of only two tool heads, urged together into a closing relationship during a connecting operation.

Deformation of the seal 110a during making of the construction, which might result in subsequent leakage through the formed joint, is avoided by virtue of the tapered profile of the surface 111. Deformation of the socket or fitting in the region of the seal in the course of carrying out a connecting operation does not take place, since by virtue of the tapering or curved configuration of the end region of the socket, distortion of the socket material is confined substantially to the end portion remote from the seal, as indicated at 111a in FIG. 8. Thus no crimping action or deformation is experienced in the vicinity of the seal which is also protected by its location radially inwardly of the annular shoulder portion 112, where stresses are minimised by the extra depth of material. Similarly the confining of deformation of the fitting to the outer end of the fitting limits deformation of the pipe to at most that amount which is necessary to ensure integrity of the joint formed, while it also assists further in avoiding buckling of the fitting between the approaching faces 120 and 121 of the closing tool jaws. As already mentioned, such buckling would inhibit full closure of the tool and the proper formation of the joint, but the curved or tapered structure of the fitting end region serves to minimise the occurrence of buckling in this region by permitting a degree of axial displacement or flow of the socket material during the latter stages of a connecting operation.

The thickness of the end part of the socket fitting, which is deformed during a connecting operation, is selected therefore so that this part of the connector can be appropriately deformed to achieve proper security and integrity of the joint, but the depth of the material cannot be excessively reduced as this as this would inhibit the necessary continuing gripping of the material of the pipe by the fitting after the joint has initially been formed by use of the tool. Selection of the correct thickness for this region of the fitting is carried out having regard to the material to be employed in the socket and the pipe which is to be connected to the socket. This dimension is accordingly not necessarily directly related to the diameter or size of the fitting or pipe. Engagement of the abutment faces 117 of the tool heads 115 against the abutment face or registration face 113 of the fitting results in uniformity between different joints formed according to the invention, in that the locating function of the face 113 ensures that substantially the same portion of each fitting used is deformed by engagement of the pressure faces of the tool against the end portions of the socket. This mutual abutment of surfaces 113 and 118 allows accurate crimping to be achieved by precisely locating the tool on the fitting in the axial sense so that the pressure faces of the tool heads are correctly and consistently aligned with the deformable portion of the socket member and by preventing any axial or longitudinal displacement of the tool along the fitting during the formation of a joint or connection.

In carrying out the method of forming a spigot and socket connection according to the invention using the fitting of FIGS. 7 and 8 and the tool heads of FIG. 9, the end portions of the pipes 102 and 103 are placed within the sockets 104 and 105 as shown in FIG. 7 and the tool heads 115 and 116 are positioned about one of the socket portions 108 or 109 in their open position. The tool is then partially closed by manual operation so that the heads 115 and 116 substantially surround the socket portion 108 and the shoulder portion 112 of the socket connector 101. At this stage no pressure is applied to the surface 111 by the tool heads, and the heads are not in their fully closed position in which they fully enclose the socket, and the surfaces 117 and 118 and the recess 119 assume their annular configurations. The axial position of the tool head is adjusted as necessary until the abutment face 113 of the socket shoulder portion and the faces 117 of the heads are substantially in abutment and maximum force is then applied by manually gripping the handles of the tool and urging them together, until the heads have moved towards each other to their maximum extent, when their facing planar surfaces 120 and 121 abut and they together assume a ring-shaped configuration. During the squeezing together of the heads, the surfaces 118 of the heads press against the surface 111 of the socket and deform the socket portion 108 in this region, so that it in turn slightly deforms the underlying portion of the wall of the pipe 102 and the socket is caused to grip the spigot or pipe 102. The abutment of the faces 113 and 118 prevents axial displacement of the tool heads in the direction of taper of socket portion 108, so that they can only move radially inwardly towards each other in the course of which movement they carry out the deforming displacement or shaping of the material of the socket portion 108 engaged by the pressure surfaces 118 of the heads.

During the final stages of the tool closing movement, elongation or displacement of the material of the socket in its outer tapered end region may take place so that the tool heads 115 and 116 can close together without any noticeable buckling of the socket wall or outward radial displacement of the material of the socket into the gap between the approaching faces 120 and 121 of the tool heads. Thus there is substantially no pinching action by the faces 120 and 121 on the socket material and accordingly no obstruction is placed in the way of the closing action of the tool heads and their movement into a fully closed condition.

It will be seen from FIGS. 9 and 10 that the tool is not reversible, and that if it is put on the sleeve the wrong way round, it is not possible to carry out a connecting operation so that incorrect use of the tool is substantially impossible. In an alternative arrangement, the inner corner 118a of the pressure surface 118 may be profiled, for example by being radiused or otherwise curved. However such radiusing does not result in the convex profile of head 18 (FIG. 4) and the surface 118 is still substantially cylindrical in the closed condition of the tool. In either case the outer leading surface of the tool head 115, when the head is in position on the sleeve, is preferably substantially flush with the leading end of the sleeve connector 101.

A similar sequence of operation is carried out to engage the other pipe within the other socket end portion 108 or 109. The gripping of the pipe within the sleeve prevents axial displacement of the pipe relative to the sleeve and may also be sufficient to seal the joint in a leakproof manner but the O-ring 110a provides an additional safe-guard against leakage and ensures integrity of the joint in this respect in all normal circumstances.

In carrying out a connecting operation according to the invention, the radial forces exerted on the wall of the pipe are limited by the meeting of the tool heads 115 and 116 on their faces 120 and 121 at the end of a closing movement or operation of the tool. Accordingly, it is not possible to exert a force of a damaging nature on the wall of the pipe, and any deformation of the pipe is limited to an amount sufficient to ensure the integrity of the joint. Complete closure of the tool heads without any substantial engagement of socket material between the faces 120 and 121 of the tool heads is ensured by the tapered profile of the socket end, which facilitates elongation or displacement of the socket material in this region and avoids any buckling of the socket or local radial displacement of the socket material into the gap between the approaching faces 120 and 121 of the tool heads.

Figure 11:
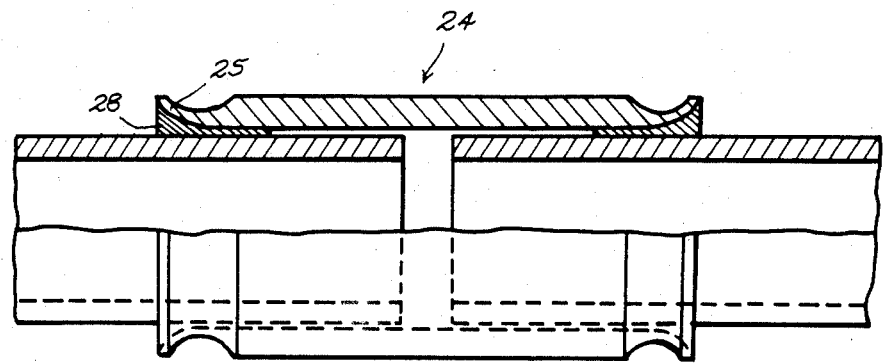
FIG. 11 shows another embodiment of sleeve connector according to the invention in part axial section.
Figure 12:
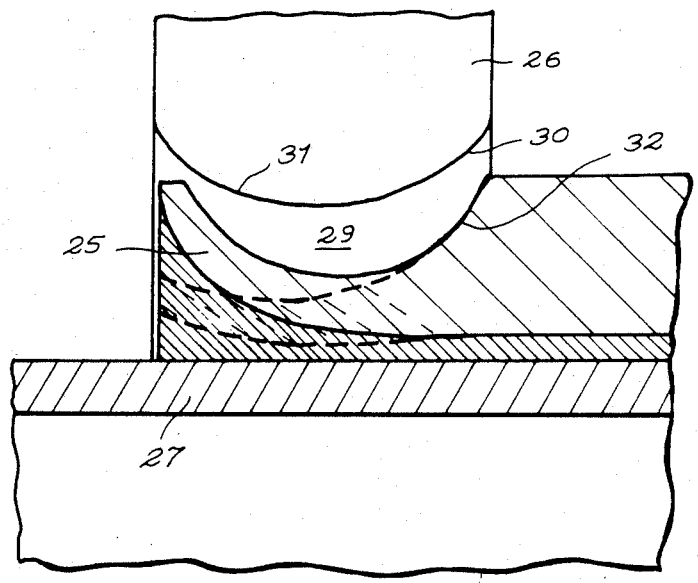
FIG. 12 shows a detail of the free end region of the connector socket of FIG. 11, together with a portion of a tool jaw suitable for forming the sleeve-to-pipe connection.

FIGS. 11 and 12 show another form of embodiment of a connector sleeve according to the invention, while FIG. 12 also shows a tool head for cooperating with it to form a joint. The socket portion 25 of the connector 24 which is of reduced wall thickness is in this case in the form of a lip, the thickness of which decreases axially outwardly of the socket and the extremity of which is turned radially outwards, so that the end region of the socket has an annular recess 29 around its external periphery. As shown in FIG. 12, a tool head 26 is positioned for cooperation with the lip 25 to form a sealing connection of the socket connector 24 with a pipe 27. In these Figures, a body of sealing material 28 is also shown between the sleeve and the pipe, but this may be omitted depending on the material of the pipe. Deformation of the lip to engage the pipe is carried out in generally similar manner to that of the previous embodiment described, but the pressure and abutment surfaces of the head 26 in this case merge together to define a generally convex working surface of the head having an abutment surface portion 30 and a combined pressure and abutment surface portion 31. Urging of the head towards the socket lip causes the surface portion 30 to engage against the abutment surface portion 32 of the recess 29, while the surface portion 31 of the head bears down on the lip to deform it into the pipe engaging configuration, axial displacement of the head 26 in a direction away from the initially radially outwardly turned socket lip 25 being prevented by the mutual abutment of the head surface portion 30 and the socket surface portion 32. The deformed configuration of the lip is shown in dotted outline in FIG. 8 and again the sealing engagement of the sleeve and pipe may be achieved without significant radial deformation of the pipe.

Figure 13:
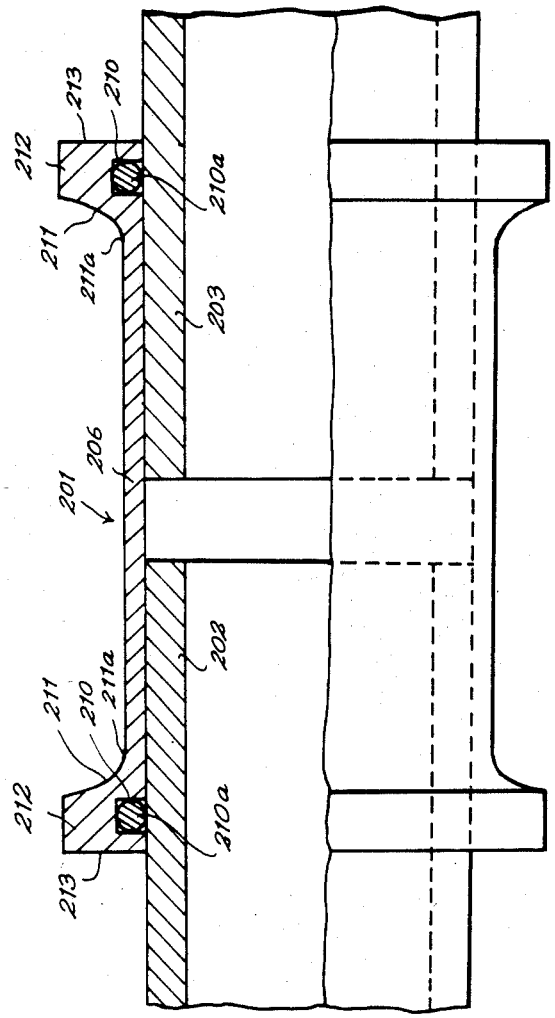
FIG. 13 shows yet another embodiment of a sleeve connector according to the invention in part axial section.

In the further embodiment of the fitting according to the invention shown in FIG. 13, the abutment faces 213 of the fitting 201 are located at the outer ends of the fitting and are defined by the outer faces of shoulder portions 212. Recesses 210 are provided within the shoulder portions 212 to receive seals 210a which engage against the outer walls of pipes 202 and 203. The reception of the pipes within the fitting 201 is similar to the arrangements already described in connection with FIGS. 1 and 7. From the axially inner sides of the annular shoulder portions 212 at the ends of the fittings, concavely curved surfaces 211 taper radially inwardly towards a relatively thin axially elongated central region 206 of the fitting 201. Portions 211a of these inwardly curved or substantially concavely tapering surfaces 211 located substantially at the ends of these surfaces adjacent to the axially outer ends of the substantially cylindrical central section 206 of the fitting are in this embodiment engaged by the pressure faces of the tool to form a joint or connection. Accordingly this embodiment of the fitting according to the invention is substantially reversed by comparison with those previously described, to the extent that the portion of the fitting which is deformed to grip the pipe is located axially inwardly of the seal 210a, along the longitudinal extent of the fitting. Accordingly use of the tool is reversed in this instance, so that the abutment faces for location or registration of the tool on the fitting are disposed against the outer end of the fitting. In other respects operation of the tool in forming the joint is similar to the methods already described and the joint functions in a generally similar, retention of the joint on the pipe being achieved by deformation of portions 211a and seals 210a being provided as required to ensure fluid-tightness.

I claim:

1. A fitting for a spigot and socket connection comprising a socket member having:
    (a) a gripping portion which is deformable for engaging a spigot received within the socket member by the application of deforming force by a pressure face of a deforming tool,
    (b) a region for accommodating an internal annulus of a deformable sealing material, said region being axially spaced from said gripping portion, so that substantially no deformation is experienced in the vicinity of said region during the application of said deforming force, and
    (c) a portion defining a non-axially disposed abutment face for abutting engagement with an abutment face of said deforming tool, said abutment face of said tool being fixedly axially spaced from said pressure face thereof, so that abutment of the abutment face of the tool against that of said abutment-face-defining socket member portion results in said pressure face of the tool being aligned with said deformable gripping portion of the socket member.

2. A fitting for a spigot and socket connection according to claim 1, wherein the socket member has an external annular shoulder portion, said deformable gripping portion of the socket member being disposed axially of one axial end of said shoulder portion and the opposite axial end region of said shoulder portion defining said abutment face.

3. A fitting for spigot and socket connection according to claim 2, wherein said abutment face of the socket member extends in a substantially radial direction.

4. A spigot and socket connection according to claim 2, wherein said region for accommodating an internal annulus of a deformable sealing material has an inwardly opening substantially annular recess for receiving an O-ring, said recess being located radially inwardly of said shoulder portion of the socket member.

5. A fitting for a spigot and socket connection according to claim 2, wherein said deformable gripping portion of the socket member extends substantially from said one axial end of the shoulder portion and the wall thickness of said deformable portion of the socket member reduces along the length of said deformable portion in a direction substantially axially away from the shoulder portion.

6. A fitting for a spigot and socket connection according to claim 5, wherein the socket member has an axially extending portion of substantially uniform wall thickness and said deformable gripping portion is disposed in a free end region of the socket member, and the shoulder portion is disposed between said axially extending portion of substantially uniform wall thickness and said deformable gripping portion, said abutment face of the socket member extending in a substantially radial direction and the radially outer surface of said deformable gripping portion being substantially concavely frustoconical.

7. A fitting for a spigot and socket connection comprising a socket having a free end gripping region which is deformable for engaging a spigot received within the socket by the application of deforming force by a pressure face of a deforming tool, the socket having an axially extending socket portion of substantially uniform wall thickness and an external annular shoulder portion disposed between said axially extending socket portion of substantially uniform wall thickness and said free-end gripping region, said gripping region extending from a front region of the shoulder portion towards the free end of the socket and an annular substantially radially extending rear face of the shoulder portion defining an abutment face of the socket for abutting engagement with an abutment face of said deforming tool said abutment face of said tool being fixedly axially spaced from said pressure face thereof, so that abutment of the abutment face of said tool against that of the socket results in said pressure face of the tool being aligned with said deformable gripping region of the socket.

8. A method of forming a spigot and socket connection comprising the steps of:

(a) inserting a spigot into a socket member having a gripping portion which is deformable for engaging a spigot received therewithin by the application of deforming force by a pressure face of a deforming tool, the socket member also having a region for accommodating an internal annulus of a deformable sealing material, said region being axially spaced from said gripping portion, so that substantially no deformation is experienced in the vicinity of said region during the application of said deforming force, and a portion defining a non-axially disposed abutment face for abutting engagement with an abutment face of said deforming tool, said abutment face of said tool being fixedly axially spaced from said pressure face thereof, so that abutment of the abutment face of the tool against that of said abutment-face-defining socket member portion results in said pressure face of the tool being aligned with said deformable gripping portion of the socket member, (b) applying said deforming tool to said socket member so that said abutment face of the tool abuts the abutment face of the socket member and the pressure face of the tool engages said deformable gripping portion of the socket member, and (c) applying deforming force to said deformable portion of the socket member by means of said tool so that said deformable portion is deformed to engage the spigot received therewithin.

* * * * *